US011647401B2

(12) United States Patent
Kottkamp et al.

(10) Patent No.: US 11,647,401 B2
(45) Date of Patent: May 9, 2023

(54) MONITORING A CELLULAR WIRELESS NETWORK FOR A SPECTRAL ANOMALY AND TRAINING A SPECTRAL ANOMALY NEURAL NETWORK

(71) Applicant: Rohde & Schwarz GmbH & Co. KG, Munich (DE)

(72) Inventors: Meik Kottkamp, Munich (DE);
Andreas Roessler, Keller, TX (US);
Reiner Stuhlfauth, Landau (DE);
Holger Rosier, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 253 days.

(21) Appl. No.: 17/003,637

(22) Filed: Aug. 26, 2020

(65) Prior Publication Data

US 2021/0136603 A1 May 6, 2021

(30) Foreign Application Priority Data

Oct. 31, 2019 (EP) .................................. 19206494

(51) Int. Cl.
*H04W 24/02* (2009.01)
*H04W 24/08* (2009.01)
(Continued)

(52) U.S. Cl.
CPC .......... *H04W 24/02* (2013.01); *H04B 17/102* (2015.01); *H04L 25/0254* (2013.01);
(Continued)

(58) Field of Classification Search
None
See application file for complete search history.

(56) References Cited

U.S. PATENT DOCUMENTS 10,405,263 B2 9/2019 Mukherjee
2010/0045506 A1 2/2010 Law et al.
(Continued)

FOREIGN PATENT DOCUMENTS

CN      108594045 A      9/2018
WO   WO-2021008689 A1 * 1/2021 ........... G06N 3/0454

OTHER PUBLICATIONS

Tandiya et al. "Deep predictive coding Neural Network for RF Anomaly Detection in Wireless Networks ," 2018 IEEE International Conference on Communications Workshops (ICC Workshops), IEEE, May 20, 2018 (May 20, 2018),pp. 1-6, XP033369964.
(Continued)

*Primary Examiner* — Duc T Duong
(74) *Attorney, Agent, or Firm* — Ditthavong, Steiner & Mlotkowski

(57) ABSTRACT

A monitoring system and monitoring method for detecting a spectral anomaly in a cellular wireless network, in particular a 5G private uRLLC network, wherein an RF receiver monitors the cellular wireless network spectrum and derives spectrum and/or physical measurement values of the spectrum of the cellular wireless network, and a processing unit of the monitoring system executes a spectral anomaly neural network trained by a machine learning algorithm in a training system, wherein the processing unit obtains the spectrum and/or the physical measurement values of the spectrum and processes it to detect a spectral anomaly information. Further, a training system and training method for training a spectral anomaly neural network, wherein the training system/method is used in a cellular wireless network, in particular a 5G private uRLLC network, and an RF receiver of the training system monitors the cellular wireless network spectrum and derives spectrum and/or physical measurement values of the spectrum of the cellular wireless network, and a processor of the training system executes a (Continued)

machine learning algorithm to train the spectral anomaly neural network based upon the derived spectrum and/or physical measurement values of the spectrum of the cellular wireless network.

12 Claims, 2 Drawing Sheets

(51) Int. Cl.
  *H04L 25/02* (2006.01)
  *G06N 3/08* (2006.01)
  *G06N 20/00* (2019.01)
  *H04B 17/10* (2015.01)
  *H04L 25/03* (2006.01)
  *H04W 24/10* (2009.01)

(52) U.S. Cl.
  CPC ....... *H04L 25/03006* (2013.01); *H04W 24/08* (2013.01); *H04W 24/10* (2013.01); *H04L 2025/03464* (2013.01); *H04L 2025/03815* (2013.01)

(56) References Cited

U.S. PATENT DOCUMENTS

| | | | | |
|---|---|---|---|---|
| 2021/0006342 | A1* | 1/2021 | Zhao | H04W 16/14 |
| 2021/0022027 | A1* | 1/2021 | Khoshgard | H04B 3/487 |
| 2021/0084601 | A1* | 3/2021 | Rofougaran | H04W 24/08 |
| 2021/0342687 | A1* | 11/2021 | Wang | G06N 3/0454 |
| 2022/0091275 | A1* | 3/2022 | Held | G06N 3/126 |
| 2022/0108160 | A1* | 4/2022 | Safavi | G06F 1/3206 |
| 2022/0174511 | A1* | 6/2022 | Kvernvik | H04L 41/147 |
| 2022/0294715 | A1* | 9/2022 | Agrawal | H04L 41/142 |
| 2022/0394049 | A1* | 12/2022 | Abrahamian | H04L 63/10 |
| 2022/0394488 | A1* | 12/2022 | Navarro | H04W 16/10 |

OTHER PUBLICATIONS

Liu et al.: "Anti-jamming Communications Using Spectrum Waterfall: A Deep Reinforcement Learning Approach", arxiv.org, Cornell University Library, 201 Olin Library Cornell University Ithaca, NY 14853, Oct. 13, 2017, XP080828551, 4 pages.

Rajendran et al.: "SAIFE: Unsupervised Wireless Spectrum Anomaly Detection with Interpretable Features", 2018 IEEE International Symposium on Dynamic Spectrum Access Networks (Dyspan), IEEE, Oct. 22, 2018, XP033498622, 9 pages.

Gunn et al.: "Anomaly Detection in Satellite Communications Systems using LSTM Networks", 2018 Military Communications and Information Systems Conference (Milcis), IEEE, Nov. 13, 2018, pp. 1-6, XPO33473096, 6 pages.

Morocho-Cayamcela et al.: "Machine Learning tor SGJ'BSG Mobile and Wireless Communications: Potential, Limitations, and Future Directions" IEEE Access, vol. 7, pp. 1371 84-1 37206, X P011748413, 2019, 23 pages.

Zhang et al.: "Deep Learning in Mobile and Wireless Networking: A Survey", arxiv.ohg Cornell University Library, 201 Olin Library Cornell University Ithaca NY 14863, Mar. 12, 2018, XPO81195949, 67 pages.

* cited by examiner

MONITORING A CELLULAR WIRELESS NETWORK FOR A SPECTRAL ANOMALY AND TRAINING A SPECTRAL ANOMALY NEURAL NETWORK

PRIORITY

This application claims priority of the European patent application EP 19 206 494.7 filed on Oct. 31, 2019, which is incorporated by reference herewith.

FIELD OF THE INVENTION

The present invention relates to a monitoring system and a monitoring method for detecting a spectral anomaly in a cellular wireless network, in particular a 5G private ultra reliable and low latency communication (uRLLC) network, comprising a radio frequency (RF) receiver and a processing unit. Further, the present invention also relates to a training system and a is training method for training a spectral anomaly neural network, wherein the training system and method are used in a cellular wireless network, in particular a 5G private uRLLC network, and comprise a RF receiver and a processor.

BACKGROUND OF THE INVENTION

Presently, with 5G NR a new cellular wireless network technology is developed, which allows an ultra reliable and low latency communication. These conditions are essential for the automation in the industry 4.0 environment.

In addition to the general development of the 5G NR, there is an interest from different sides, for example some companies, to also develop a 5G private cellular/mobile wireless network, which can be used in a restricted/limited area, for example a factory side of a company, wherein the 5G private network is logically and/or physically separated from the 5G public network.

In more detail, in Germany and some other countries it is/will be possible to acquire a private spectrum (e.g. 3.7-3.8 GHz) for a limited area of a factory side to install and operate an own 5G private network.

The installation and operation of a 5G private network, is, however, associated with regulatory requirements, as the compliance with maximum sender output power at property borders, the planning and technical characterization of base stations in advance and their antenna technology, and the capacity planning/calculation (spectrum).

The operation of an own 5G private network with a private spectrum then, however, offers the possibility to have a highly reliable/ultra reliable data communication with low latency, which can be used to control machines and modular production units and can also be used for the control of autonomously moving robots and/or vehicles. This allows a highly flexible and modular production line.

In the wide field of wireless technology in general and also in a 5G network, it is possible that an interference/disruption/disturbance or general any kind of fault on the air path arises, for example between a base station and a terminal device. In the 5G public network there are different application fields in which a certain susceptibility to interferences can be tolerated.

However, when using a 5G private network in the application field of a production environment at a limited area of a factory side of a company, such interferences can potentially result in a lot of damage and therefore high costs and have to be avoided, or at least identified very quickly in order to take appropriate countermeasures.

In the past and at the moment wireless communication in the industrial 4.0 environment has essentially only been used for non-safety relevant cases and mostly implemented via WIFI/WLAN. Mobile radio technologies or cellular wireless networks such as UMTS and LTE have not been used until now, because they could normally not be operated privately, since no private spectrum was available for UMTS or LTE (only very few examples are known so far where a public operator has implemented a private network for an industry 4.0 costumer).

An essential target for installing and operating a 5G private network in a limited area of a factory side of a company, is therefore to avoid interferences and in case they cannot be completely avoided, to identify them as soon as possible in order to take appropriate countermeasures.

It is therefore a need of the present invention to identify very quickly any interferences/spectral anomalies arising in a cellular wireless network, in particular in a 5G private network.

SUMMARY OF THE INVENTION

The present invention relates a monitoring system and a monitoring method for detecting a spectral anomaly in a cellular wireless network, in particular a 5G private uRLLC network, wherein an RF receiver of the monitoring system monitors the cellular wireless network spectrum and derives spectrum and/or physical measurement values of the spectrum of the cellular wireless network, and a processing unit of the monitoring system executes a spectral anomaly neural network trained by a machine learning algorithm in a training system, wherein the processing unit obtains the spectrum and/or the physical measurement values of the spectrum and processes it to detect a spectral anomaly information.

Advantageously, the monitoring system further comprises a memory for storing the spectrum and/or the physical measurement values of the spectrum derived by the RF receiver, and the processing unit obtains the spectrum and/or the physical measurement values of the spectrum from the memory.

In a preferred embodiment, the RF receiver monitors and derives the spectrum over time and frequency to produce a waterfall diagram, wherein the processing unit obtains and processes the waterfall diagram. Alternatively or additionally, the RF receiver derives power values over frequency per time unit as physical measurement values of the spectrum, wherein the processing unit obtains and processes the power values over frequency per time unit.

In addition, it is possible that the monitoring system further derives additional parameters of an active communication link in the cellular wireless network, in particular the achieved data rate/bit rate, the signal-to-noise ratio and/or the latency time, and the processing unit further obtains and processes the additional parameters to detect a spectral anomaly information.

Advantageously, the processing unit is arranged away from the RF receiver and away from the cellular wireless network, in particular in a cloud service.

The monitoring system can further comprise an output unit, in particular a display or a monitor, for presenting the detected spectral anomaly information.

In a preferred embodiment, the monitoring system comprises at least two RF receivers and the system triangulates the location of a spectral anomaly detected by the processing unit, wherein the triangulation is based on a correlation of the spectrums and/or physical measurement values of the at least two RF receivers.

In addition, it is possible that the derived spectrum and/or physical measurement values of the spectrum of the cellular wireless network are used to further train the spectral anomaly neural network trained by a training method.

The present invention further relates to a training system and a training method for training a spectral anomaly neural network, wherein the training system/method is used in a cellular wireless network, in particular a 5G private uRLLC network, and an RF receiver of the training system monitors the cellular wireless network spectrum and derives spectrum and/or physical measurement values of the spectrum of the cellular wireless network, and a processor of the training system executes a machine learning algorithm to train the spectral anomaly neural network based upon the derived spectrum and/or physical measurement values of the spectrum of the cellular wireless network.

In a preferred embodiment the training system further comprises at least two test communication devices, wherein a first test communication device of the at least two test communication devices has an active communication link to a second test communication device of the at least two test communication devices, and a signal anomaly generator, in particular a broadband jammer or continuous waveform, CW, generator, for generating a signal anomaly distorting the communication link, wherein the spectral anomaly neural network is further trained based upon the generated signal anomaly and/or additional parameters of the active communication link, in particular the achieved data rate/bit rate, the signal-to-noise ratio and/or the latency time.

Advantageously, the RF receiver monitors and derives the spectrum over time and frequency to produce a waterfall diagram, wherein the spectral anomaly neural network is trained based upon the waterfall diagram. Alternatively or additionally, the RF receiver derives power values over frequency per time unit as physical measurement values of the spectrum, wherein the spectral anomaly neural network is trained based upon the power values over frequency per time unit.

It is further possible that the processor is arranged away from the RF receiver and away from the cellular wireless network, in particular in a cloud service.

By the monitoring system, the monitoring method, the training system and the training method of the present invention it is therefore possible to train a spectral anomaly neural network by a machine learning algorithm based on error free communication as well as possible interferences/spectral anomalies. This trained spectral anomaly neural network can then be used for monitoring a 5G private network, in particular the spectrum of the network, to detect spectral anomalies.

BRIEF DESCRIPTION OF THE DRAWINGS

These and other aspects and advantages of the present invention will become more apparent when studying the following detailed description, in connection with the figures in which.

As already described above, in the technical field of 5G NR it is possible to install and operate a 5G private network on a limited area of, for example, a factory site of a company. This is for example interesting for a high flexible and modular production line. In such a production environment, it is however then essential to avoid any interferences/spectral anomalies in the 5G private network, in particular in the air path of the 5G private network, for example between a base station and a terminal device. However, it is not always possible to avoid any interference at any time. In such a case, it is desirable to identify/detect such interferences in the 5G private network as soon as possible, in order to take appropriate countermeasures.

DETAILED DESCRIPTION OF PREFERRED EMBODIMENTS

Figure 1:
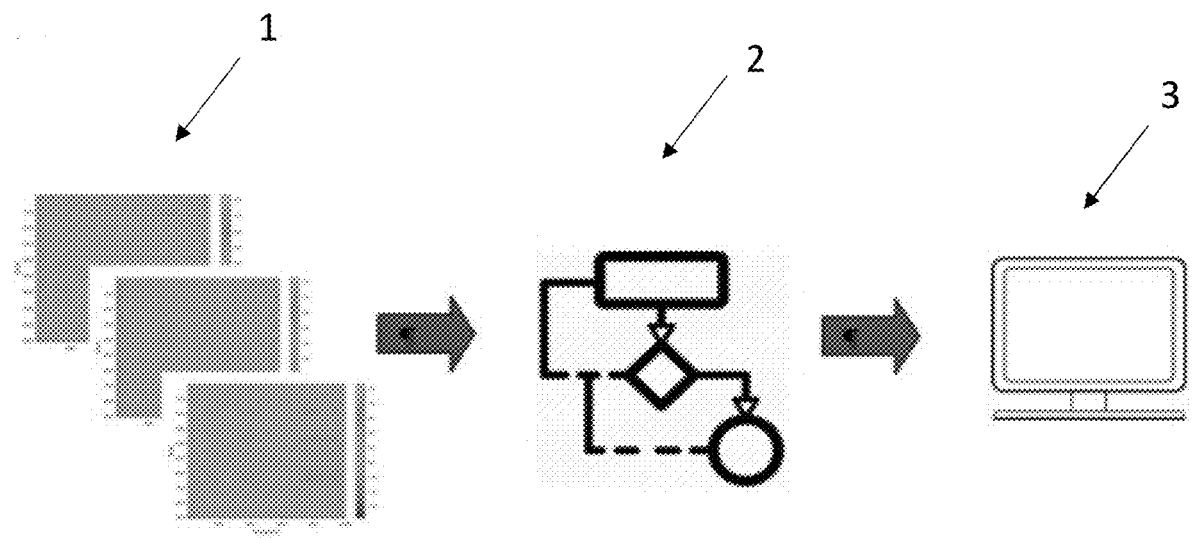
FIG. 1 shows schematically the idea of the present invention.

The general idea of the present invention is shown in FIG. 1, wherein data of a spectrum that is monitored and derived, like for example waterfall diagrams 1, is used by a machine learning algorithm to train a spectral anomaly neural network 2. This trained spectral anomaly neural network 2 is then used to detect a spectral anomaly, wherein again data of a spectrum that is monitored and derived, like for example waterfall diagrams 1, is used by the spectral anomaly neural network 2. The result of the detection respectively the detected spectral anomaly can be presented/shown on a output unit, like a display or monitor 3.

Figure 2:
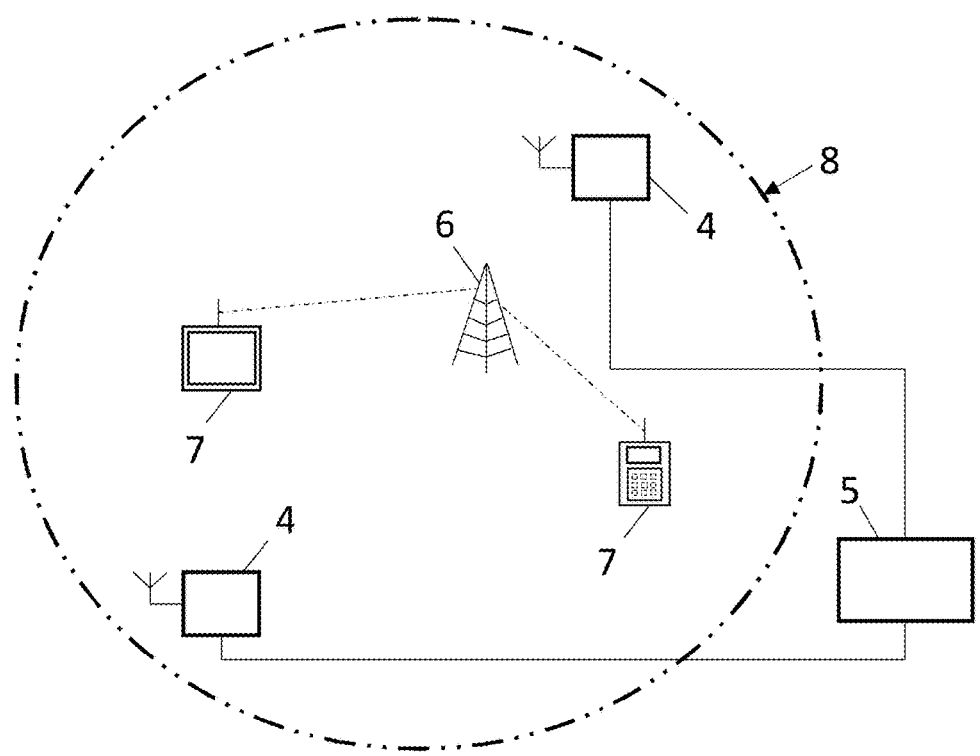
FIG. 2 shows a monitoring system according to the present invention.

In more detail, as shown in FIG. 2, the present invention provides a monitoring system and a monitoring method for detecting a spectral anomaly in a 5G private uRLLC network 8. Such a 5G private network 8 can be installed and operated for example in a limited area of a factory site of a company. The 5G private network 8 in the limited area can comprise for example a base station 6 and terminal devices 7 that are in communication with the base station 6.

In the monitoring system and the monitoring method shown in FIG. 2, a RF receiver 4 monitors the spectrum of the 5G private network 8 and derives spectrum and/or physical measurement values of the spectrum. Based on the derived spectrum and/or physical measurement values, a processing unit 5 executes a spectral anomaly neural network that has been trained by a corresponding training system or training method to detect possible spectral anomalies in the 5G private network 8.

That means that the radio communication in the cellular wireless network, namely the 5G private URLLC network 8, is captured by a corresponding RF capture device, namely the RF receiver 4 of the inventive monitoring system, and the captured data of the radio communication is sent to a corresponding processing device, namely the processing unit 5 of the inventive monitoring system, to be analyzed based on a trained spectral anomaly neural network to detect anomalies/interferences.

Figure 3:
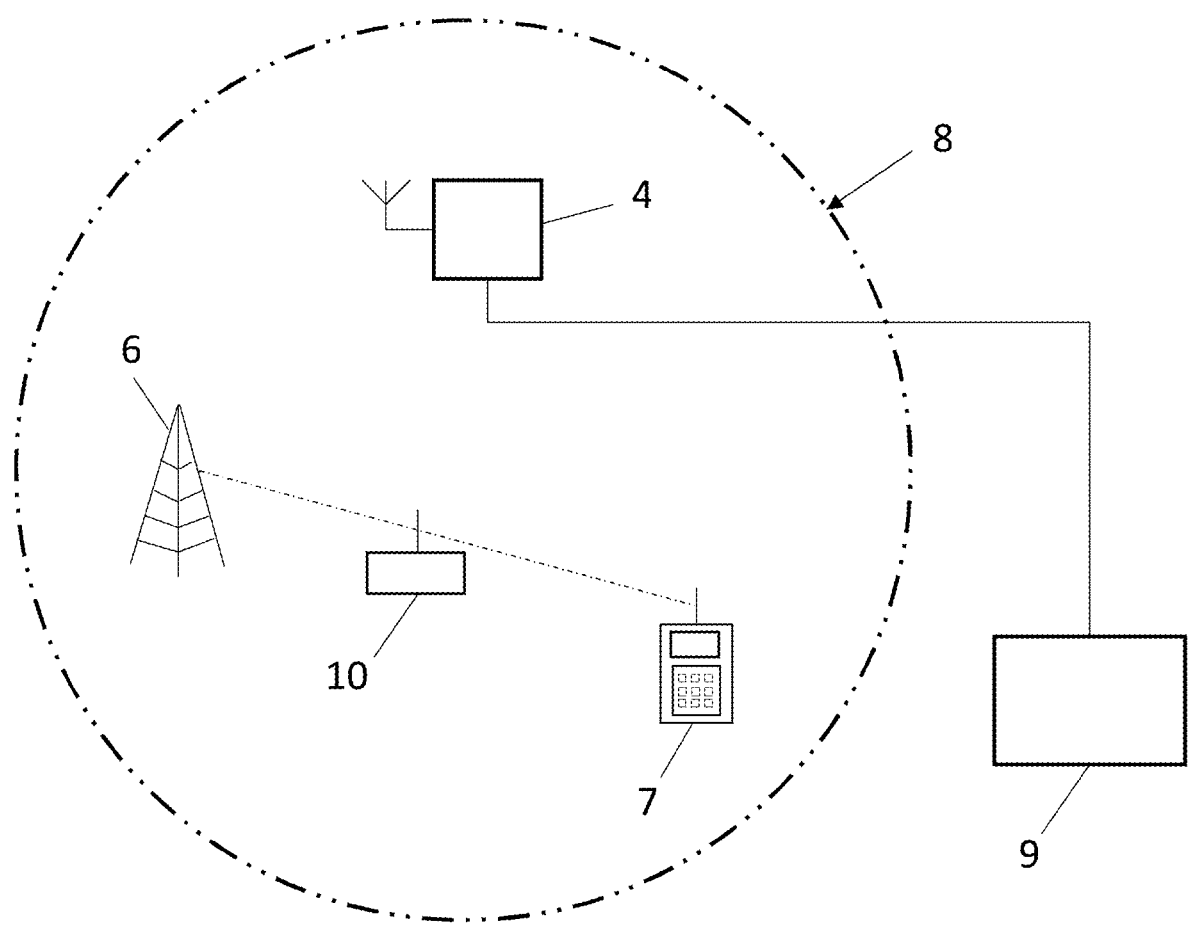
FIG. 3 shows a training system according to the present invention.

For the training of the spectral anomaly neural network, the present invention further provides a training system and a training method, wherein the training system and the training method are also used in a 5G private uRLLC network. FIG. 3 shows such a training system, wherein, similar to FIG. 2, such a 5G private uRLLC network 8 can be installed and operated for example in a limited area of a factory site of a company. The 5G private network 8 shown in FIG. 3 can be the same as the 5G private network 8 shown in FIG. 2. That means that spectral anomaly neural network is trained in the same 5G private network 8, in which later on the monitoring system and the monitoring method monitor the spectrum and possibly detect spectral anomalies.

Additionally, it would be also possible that a spectral anomaly neural network trained in one 5G private network of a factory site of a company can be used in another 5G private network of another factory site of another company. For example, it would be possible that the trained spectral anomaly neural network of one 5G private network is used as basis for the training of another 5G private network. It would be also possible that the trained spectral anomaly neural network of one 5G private network is directly used in another 5G private network for the monitoring.

In the training system and the training method an RF receiver 4 monitors the 5G private network spectrum and derives spectrum and/or physical measurement values of the spectrum. This derived spectrum and/or physical measurement values of the spectrum are then used for the training of the spectral anomaly neural network, wherein a processor 9 executes a machine learning algorithm to train the spectral anomaly neural network based upon the derived spectrum and/or physical measurement values of the spectrum of the cellular wireless network.

With such a constellation of the training system it is then possible that an error-free communication can be learned, wherein the detection of the error-free communication is based for example, among other things, on the recognition of always available signal components, e.g. on the so-called SSB blocks (in 3GPP specified synchronization and broadcast signals) in case of 5G.

For the learning and training of interferences/anomalies, the training system comprises at least two test communication devices, for example a base station 6 and a terminal device 7, wherein a communication link is established between the at least two test communication devices 6 and 7, to have an active communication link. Further, the training system comprises a signal anomaly generator 10 for generating a signal anomaly distorting the communication link, wherein such a generator can be for example a broadband jammer or a continuous waveform (CW) generator, to produce interference signals.

Based on the error-free communication already learned and trained and the signal anomaly generated by the signal anomaly generator 10 that distorts the communication link, spectral anomalies are additionally learned, wherein in detail, the spectral anomaly neural network is further trained based upon the generated signal anomaly.

In the monitoring system, the monitoring method, the training system and the training method one possible implementation for the monitoring and deriving of the RF receiver 4 can be that the RF receiver 4 monitors and derives the spectrum over time and frequency to produce waterfall diagrams, wherein this waterfall diagrams are then used in the training system and the training method to train the spectral anomaly neural network based on the images from the waterfall diagrams. In the monitoring system and the monitoring method the waterfall diagrams, respectively the images of the waterfall diagrams are then used to detect spectral anomalies and possibly even classify them in the waterfall diagram, wherein for example a vertical line in the waterfall diagram will indicate a CW interference. The potential classification could serve as a basis for proposing countermeasures.

Another potential implementation for the monitoring and deriving of the RF receiver 4 can be that the RF receiver 4 derives/uses power values over frequency per time unit as physical measurement values of the spectrum and in the training system and the training method these power values over frequency per time unit are used to train the temporal sequence of these values (pattern recognition). In the monitoring system and monitoring method, these power values over frequency per time unit are then used to detect a spectral anomaly.

In addition to spectral anomalies arising in the spectrum of the cellular wireless network that are similar to those generated by the signal anomaly generator 10, it is also possible that faulty electronic components could cause interferences and anomalies, which could be also detected by the monitoring system and the monitoring method. In this regard, the monitoring system and the monitoring method can be also used to monitor both a channel used for communication as well as frequency ranges outside of the of the frequency band used. The additional observation of frequency bands outside the channel may allow the detection of faults from faulty electronic components, which are independent of the impairment of the communication path to material or other point out component damage. For example, a motor of a robot could have increased power values in dedicated frequency bands, before it fails due to material fatigue.

Further, in addition to the detection of spectral anomalies, the monitoring system and the monitoring method can also be developed to localize spectral anomalies. By using at least two RF receivers 4 positioned at different points in the 5G private network 8, as shown in FIG. 2, different spectrums and/or physical measurement values are monitored and derived. With these different spectrums and/or physical measurement values it is then possible that the position/location of a spectral anomaly detected by the processing unit 5 is triangulated, wherein the triangulation is based on a correlation of the spectrums and/or physical measurement values of the at least two RF receivers 4. Further, the at least two RF receivers 4 can be connected to one processing unit 5.

The data, respectively the spectrum and/or physical measurement values of the spectrum, from the RF spectrum measurement can also be correlated with data from an active connection/communication. Performance parameters from an active communication are e.g. the achieved data rate, the underlying signal-to-noise ratio or the latency time on the active communication. These parameters can, in addition to the RF spectrum, improve the training and the identification of anomalies. The monitoring system further derives such additional parameters of an active communication link in the cellular wireless network, and the processing unit 5, in addition to the spectrum and/or physical measurement values of the spectrum, further processes the additional parameters to detect a spectral anomaly. In the training system the spectral anomaly neural network can be further trained based upon the additional parameters of the active communication link.

The RF receiver 4 of the monitoring system can be located/placed together with the processing unit 5 in one housing or close to each other. However, it is also possible that the processing unit 5 is placed away from the RF receiver 4 and/or away from the cellular wireless network as shown in FIG. 2, in particular in a cloud service or centrally in a computer center of a company. Thus, the processing unit 5 can be also implemented on a central computer or server.

Similar, also the RF receiver 4 of the training system can be located/placed together with the processor 9 in one housing or close to each other. However, it is also possible that the processor 9 is placed away from the RF receiver and/or away from the cellular wireless network as shown in FIG. 3, in particular in a cloud service or centrally in a computer center of a company. Thus, the processor 9 can be also implemented on a central computer or server.

Further, data, like the spectrum and/or physical measurement values of the spectrum and/or the additional parameters, can also be recorded continuously by the monitoring system and the monitoring method during operation to improve the spectral anomaly neural network, wherein the derived data is used to further train the spectral anomaly neural network. The spectral anomaly neural network therefore continues to improve over the course of operation.

While various embodiments of the present invention have been described above, it should be understood that they have been presented by way of example only, and not limitation. Numerous changes to the disclosed embodiments can be made in accordance with the disclosure herein without departing from the spirit or scope of the invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed:

1. A monitoring system for detecting a spectral anomaly in a cellular wireless network, in particular a 5G private ultra reliable and low latency communication, uRLLC, network, comprising
    an radio frequency, RF, receiver for monitoring the cellular wireless network spectrum and for deriving spectrum and/or physical measurement values of the spectrum of the cellular wireless network, and
    a processor for executing a spectral anomaly neural network trained by a machine learning algorithm in a training system, wherein the processor is configured to obtain the spectrum and/or the physical measurement values of the spectrum and process it to detect a spectral anomaly information,
    wherein the RF receiver is configured to monitor and derive the spectrum over time and frequency to produce a waterfall diagram, wherein the processor is configured to obtain and process the waterfall diagram, and/or
    wherein the RF receiver is configured to derive power values over frequency per time unit as physical measurement values of the spectrum, wherein the processor is configured to obtain and process the power values over frequency per time unit.

2. The monitoring system according to claim 1, further comprising a memory for storing the spectrum and/or the physical measurement values of the spectrum derived by the RF receiver, and the processor is configured to obtain the spectrum and/or the physical measurement values of the spectrum from the memory.

3. The monitoring system according to claim 1, wherein system is further configured to derive additional parameters of an active communication link in the cellular wireless network, in particular the achieved data rate/bit rate, the signal-to-noise ratio and/or the latency time, and wherein the processing unit processor is further configured to obtain and process the additional parameters to detect a spectral anomaly information.

4. The monitoring system according to claim 1, wherein the processor is arranged away from the RF receiver and away from the cellular wireless network, in particular in a cloud service.

5. The monitoring system according to claim 1, further comprising an output unit, in particular a display or a monitor, for presenting the detected spectral anomaly information.

6. The monitoring system according to claim 1, wherein the system comprises at least two RF receivers and the system is configured to triangulate the location of a spectral anomaly detected by the processor, wherein the triangulation is based on a correlation of the spectrums and/or physical measurement values of the at least two RF receivers.

7. A training system for training a spectral anomaly neural network, wherein the training system is used in a cellular wireless network, in particular a 5G private ultra reliable and low latency communication, uRLLC, network, and the training system comprises:
    an radio frequency, RF, receiver for monitoring the cellular wireless network spectrum and for deriving spectrum and/or physical measurement values of the spectrum of the cellular wireless network, and
    a processor for executing a machine learning algorithm to train the spectral anomaly neural network based upon the derived spectrum and/or physical measurement values of the spectrum of the cellular wireless network
    at least two test communication devices, wherein a first test communication device of the at least two test communication devices has an active communication link to a second test communication device of the at least two test communication devices,
    a signal anomaly generator in particular a broadband jammer or continuous waveform, CW, generator, for generating a signal anomaly distorting the communication link,
    wherein the spectral anomaly neural network is further trained based upon the generated signal anomaly and/or additional parameters of the active communication link, in particular the achieved data rate/bit rate, the signal-to-noise ratio and/or the latency time.

8. The training system according to claim 7,
    wherein the RF receiver is configured to monitor and derive the spectrum over time and frequency to produce a waterfall diagram, wherein the spectral anomaly neural network is trained based upon the waterfall diagram, and/or
    wherein the RF receiver is configured to derive power values over frequency per time unit as physical measurement values of the spectrum, wherein the spectral anomaly neural network is trained based upon the power values over frequency per time unit.

9. The training system according to claim 7, wherein the processor is arranged away from the RF receiver and away from the cellular wireless network, in particular in a cloud service.

10. A monitoring method for detecting a spectral anomaly in a cellular wireless network, in particular a 5G private ultra reliable and low latency communication, uRLLC, network, comprising
    monitoring, by an radio frequency, RF, receiver, the cellular wireless network spectrum and deriving spectrum and/or physical measurement values of the spectrum of the cellular wireless network, and
    executing a spectral anomaly neural network trained by a machine learning algorithm in a training method, by processing the derived spectrum and/or the physical measurement values of the spectrum to detect a spectral anomaly information, wherein the RF receiver monitors and derives the spectrum over time and frequency to produce a waterfall diagram, wherein the method obtains and processes the waterfall diagram, and/or wherein the RF receiver derives power values over frequency per time unit as physical measurement values of the spectrum, wherein the method obtains and processes the power values over frequency per time unit.

11. The monitoring method according to claim 10, wherein the derived spectrum and/or physical measurement values of the spectrum of the cellular wireless network are used to further train the spectral anomaly neural network trained by a training method.

12. A training method for training a spectral anomaly neural network, wherein the training method is used in a cellular wireless network, in particular a 5G private ultra reliable and low latency communication, uRLLC, network, and the method comprises:

monitoring, by an radio frequency, RF, receiver, the cellular wireless network spectrum and deriving spectrum and/or physical measurement values of the spectrum of the cellular wireless network, and executing a machine learning algorithm to train the spectral anomaly neural network based upon the derived spectrum and/or physical measurement values of the spectrum of the cellular wireless network, wherein a first test communication device of at least two test communication devices in the cellular wireless network has an active communication link to a second test communication device of the at least two test communication devices in the cellular wireless network and the method further comprises generating a signal anomaly distorting the communication link, wherein the spectral anomaly neural network is further trained based upon the generated signal anomaly and/or additional parameters of the active communication link, in particular the achieved data rate/bit rate, the signal-to-noise ratio and/or the latency time.

\* \* \* \* \*